Nov. 16, 1965     E. M. FONTAINE ETAL     3,217,465
ADSORPTION PROCESS AND APPARATUS FOR GAS DEHYDRATION
AND HYDROCARBON RECOVERY
Filed June 5, 1958     5 Sheets-Sheet 1

INVENTORS.
Earnest C. Hill
Edwards M. Fontaine
BY
Arthur L Wade

Nov. 16, 1965   E. M. FONTAINE ETAL   3,217,465
ADSORPTION PROCESS AND APPARATUS FOR GAS DEHYDRATION
AND HYDROCARBON RECOVERY
Filed June 5, 1958   5 Sheets-Sheet 5

INVENTORS.
Earnest C. Hill
Edwards M. Fontaine
BY

United States Patent Office 3,217,465
Patented Nov. 16, 1965

3,217,465
ADSORPTION PROCESS AND APPARATUS FOR GAS DEHYDRATION AND HYDROCARBON RECOVERY
Edwards M. Fontaine and Ernest C. Hill, Houston, Tex., assignors to National Tank Company, Tulsa, Okla., a corporation of Nevada
Filed June 5, 1958, Ser. No. 740,144
7 Claims. (Cl. 55—20)

This invention relates to the dehydration of gas and the recovery of condensable hydrocarbons therefrom. More specifically, the invention relates to processing natural gas, at its source, prior to transmission thereof through pipelines, in order to remove moisture and condensable hydrocarbons.

For the purposes of this invention the flow of gas to be processed will be known as the flow or the main stream. The flow, or main, stream of natural gas from a wellhead is always saturated or partially saturated with moisture in accordance with its origin, its pressure and temperature. If the gas is transmitted with this moisture in it, it may severely corrode the metal pipe line through which it is transmitted. Further, this moisture at lowered temperatures may form hydrates which clog the pipe lines and valves. One common practice involves conducting the wet gas through large cylinders filled with adsorbent material. Using at least two cylinders, it is possible to have a continuous gaseous transmission through adsorbent by alternating between the plurality of towers. The towers with adsorbent material saturated with moisture are re-activated with either heated air or gas.

Additionally, it is recognized that such streams are saturated or partially saturated with valuable condensable hydrocarbons, such as gasoline, which can be removed from the gas stream by adsorbent material. The removal of both the condensable hydrocarbons and water from natural gas, prior to or during transmission is possible in this manner and must be done efficiently and economically.

Many of the problems of water and hydrocarbons removal by adsorbent material center about the application of a reactivation fluid with which the water and hydrocarbons are removed from saturated adsorption material. It has been customary to split off a portion of the saturated stream for this purpose. The split-off, activation, stream is passed through a heater to elevate its temperature to the degree that when it is passed through the beds of saturated adsorption material it will vaporize and remove the water and hydrocarbons. Subsequently, the reactivation stream is cooled in a condenser. The output of the condenser is passed to a separator where the condensed water and hydrocarbons are removed as separate liquid phases. The prior art has shown the gaseous portion of the reactivation stream as returned to the main stream on its way through the adsorption step. However, there are fundamental advantages to recycling the reactivation fluid rather than returning it to the flow, or main stream. Regardless of whether the reactivation stream is returned to the main stream or recycled, there is the problem of providing energy for its circulation through the heater, adsorption material, condenser, and separator.

A principal object of the present invention is to circulate captive reactivation fluid of an adsorption process with the power of the main stream which is to be processed.

Another object is to circulate a captive reactivation fluid by the power of the main stream coming to the process and interchanging fluid between the two streams as required by the relative expansion and contraction between their two volumes.

Another object is to control the power of the main stream applied to circulate a captive reactivation stream in order to vary the flow rate of the captive stream in accordance with the flowing temperature of the captive stream.

Another object is to synchronize the shunting of a captive reactivation fluid stream of a continuous adsorption process powered by the main stream through a source of heat with alternating the passage of the heated reactivation stream through a plurality of adsorbent beds.

Another object is synchronize the passage of heated portions of a captive reactivation fluid stream of a continuous adsorption process powered by the main stream through alternate adsorbent beds with the passage of cool portions of a captive reactivation fluid stream through the beds.

Another object is cool a captive reactivation fluid stream of a continuous adsorption process powered by the main stream with the main stream as it is received by the adsorption process.

Another object is to cool a captive reactivation fluid stream of a continuous adsorption process powered by the main stream with any one, or combination, of the relatively cool fluid streams of the process.

The present invention contemplates a first circuit for conducting natural gases of the circuit through a bed of adsorbent material in order to remove water and hydrocarbons from the gas by contact with the adsorbent material. A second circuit is arranged to alternately conduct a reactivating gas through a heating zone and then the bed of adsorbent material. A mechanical device is arranged to bridge between the two circuits in transferring the energy of the flow in the first circuit to the flow in the second circuit for circulating the reactivating gas through the second circuit. Finally, the reactivating gas is taken through a condenser and separator for recovering hydrocarbons that will condense and also to condense and collect and dispose of water removed from the beds.

The invention further contemplates that a first circuit conducting natural gas through a bed of adsorbent material and a second circuit of reactivating gas periodically heated to vaporize hydrocarbons and water from the adsorbent material, be connected by a conduit through which the gases will be interchanged between the circuits as the heating of the activation circuit gas causes a relative change between the volumes of the gases of the two circuits.

The invention further contemplates that the device transferring the energy from the first circuit to the second circuit for circulation of the reactivating gas in the second circuit be controlled in accordance with the heating of the gas of the second circuit.

The invention further contemplates that the natural gases of the first circuit be passed through alternate beds of adsorbent material with valved conduits which are controlled to synchronize the passage of a periodically heated captive reactivation fluid stream powered by the main stream through the beds in order to adsorb water and hydrocarbons from the main stream of natural gases and desorb these products into the captive stream.

The invention further contemplates the reduction of the temperature of the captive stream from the beds to its dew point by heat exchange with the natural gases of the first circuit.

The invention further contemplates reduction of captive stream temperature from the beds by heat exchange with air, water, the desorbed natural gases, a cooler portion of the captive stream, or any economical combination of these mediums.

Other objects, advantages, and features of this invention will become more apparent to one skilled in the art upon consideration of the written specification, appended claims, and attached drawings wherein;

Figure 1:
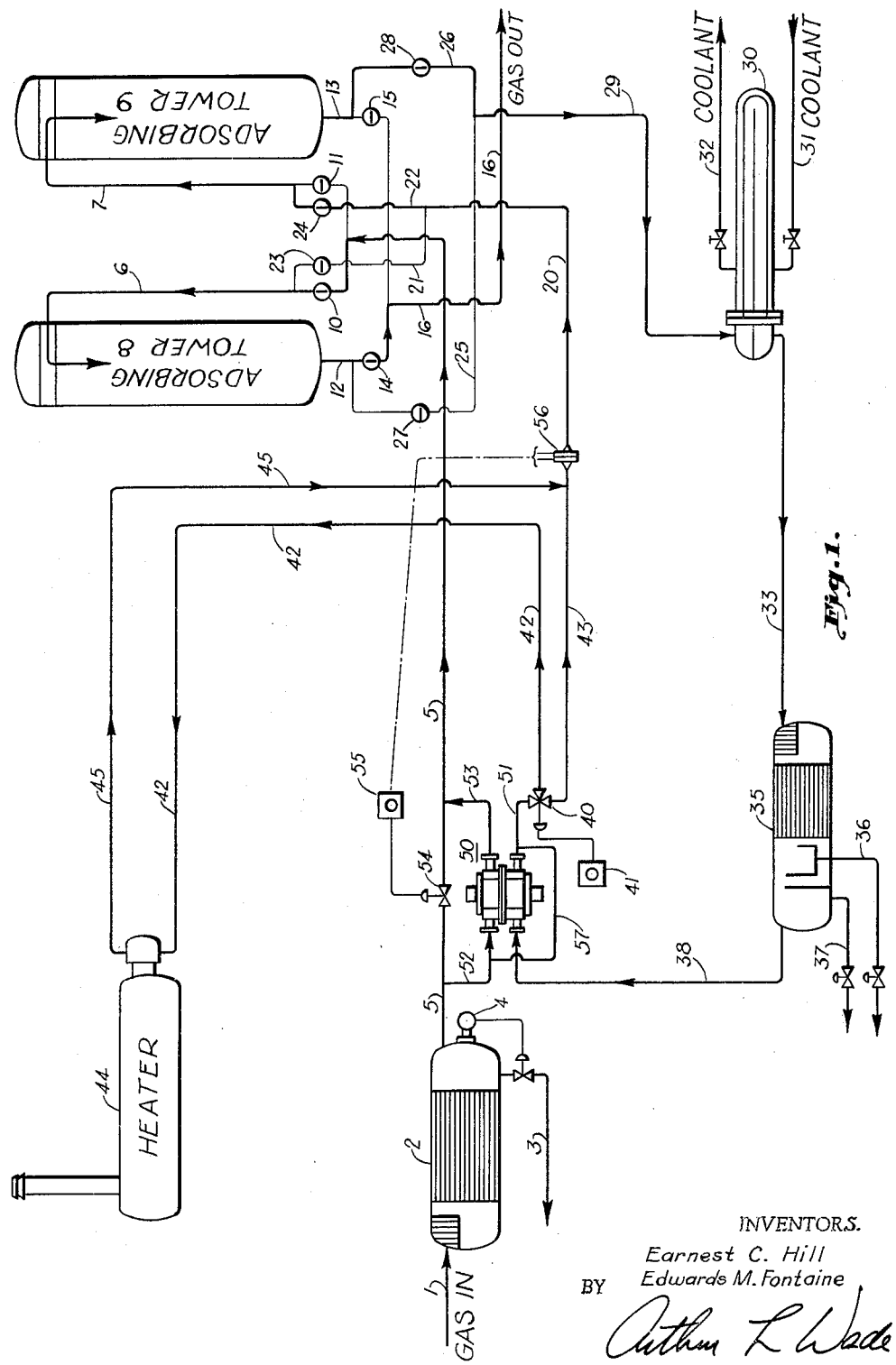
FIG. 1 is a schematic illustration of a complete adsorption process in which the invention is embodied.

Referring specifically to FIG. 1, conduit 1 is illustrated as bringing natural gas into the adsorption process. This is the gas which must be dried in order to reduce corrosion and obviate hydrate formation in a transmission pipeline. An initial separation of gas and liquid phases of this conduit 1 stream is provided by separator 2.

Separator 2 may take many well known forms. Any of the well known forms will separate liquid and gaseous phases. The liquid, which may be water and hydrocarbons, is removed through conduit 3, controlled by level controller 4. The gaseous phase is removed from separator 2 by conduit 5. The hydrocarbons and water may be flashed and separated or may be conducted to a stabilization process not shown, and water may be removed and disposed of ahead of storage or stabilization of the hydrocarbon phase.

Conduit 5 becomes a first circuit for the main, or flow, stream of natural gas which the present process strips of adsorbable hydrocarbons and water. Although many conditions will determine the temperature and pressure of this main stream, at this point, it is reasonable to expect an 80° F. temperature and pressure to 1200 pounds or more per square inch.

As illustrated in FIG. 1, the mechanics of removing condensable hydrocarbons and water from the gas of the first circuit is simple to follow. Conduit 5 is divided into branch conduit 6 and branch conduit 7. The gas of conduit 5 is thereby alternately directed through beds of adsorbent in tower 8 and tower 9. It is conventional to direct the flow from these conduits downwardly through these towers which are, essentially, cylinders in a vertical position.

Valve 10 in branch conduit 6 and valve 11 in branch conduit 7 are alternately opened and closed directing the main stream of conduit 5 through the beds of adsorbent. The valves may be operated pneumatically or electrically, depending upon the type of control system desired.

Adsorbent material

Various types of adsorbent material have been employed. Specifically, silica gel has been successfully employed in recovering a large percentage of condensable hydrocarbons. The selection of the specific adsorption material and the arrangement of flow through the towers depends on specific design conditions which need not be given further consideration.

Main circuit

The main, or flow, stream in conduit 5, alternately passed to branch conduit 6 and branch conduit 7, and correspondingly alternately passed through tower 8 and tower 9, is passed out of the bottom of the towers and into conduit 12 or conduit 13. Valves 14 and 15 then connect either conduit 12 or conduit 13 to conduit 16 to complete the main circuit. FIG. 1 illustrates the valves 10, 11, 14 and 15 positioned to pass the conduit 5 flow through the adsorbent bed of tower 8 and on into conduit 16 as it leaves the dehydration and hydrocarbon recovery process.

The receiving conduit 16, for the lean and dry gas out of the towers is shown in FIG. 1 as passing the gas on to a transmission pipeline. However, the gas out of one tower is cool, relative to the other tower which is simultaneously reactivated with a gas stream heated to vaporize the water and hydrocarbons. Therefore, it is possible to pass the lean, dry and relatively cool gas through the hotter tower to reduce its temperature in preparation to adsorb hydrocarbons and water from the main, or flow, stream in conduit 5.

In generalization, the first circuit of the process is characterized by conduits 1, 5 and 16 which pass the main, or flow, stream of gas through the adsorbing towers. A second circuit is arranged to be passed through the towers to vaporize the hydrocarbons and water adsorbed therein. The two circuits are mechanically connected so the main stream can provide energy for the reactivation stream of the second circuit. With this energy the reactivation stream is circulated through the towers and through a condensing step to liquefy the water and hydrocarbons. Finally, the liquids are separated and the gaseous portion is heated so it may again vaporize the tower products. As the reactivation gas is alternately heated and cooled to function in the process, its volume, fluctuates. An open conduit is provided between the two circuits in order to exchange gas between the two streams.

Reactivation circuit

The second circuit is clearly traced from conduit 20 which is connected to branch conduits 21 and 22. Valve 23 in branch conduit 21 and valve 24 in branch conduit 22 alternately pass reactivation gas from conduit 20 into branch conduit 6, and branch conduit 7. Obviously, valve 10 is controlled to open when valve 23 is closed, and valve 11 is controlled to close when valve 24 is open. The object of controlling the valves in this manner is to pass the reactivation gas of conduit 20 through the tower which has adsorbed hydrocarbons and water from the first circuit of conduit 5.

The reactivation gas passes from the towers, through conduits 12 and 13. Branch conduit 25 removes the reactivation gas out of tower 8 above valve 14. Branch conduit 26 is connected above valve 15 for a similar purpose. Valves 27 and 28 are controlled in conduits 25 and 26 to alternately pass reactivation gas into conduit 29. All the valves in the second, or reactivation circuit, are illustrated in FIG. 1 as passing the gas through tower 9 while the first circuit is valved to pass the main stream through tower 8. Thus, FIG. 1 illustrates the function of the two circuits in passing the main stream through the adsorbing towers to deposit hydrocarbons and water and passing the reactivation stream through the towers to vaporize and remove the hydrocarbons and water therefrom.

Cooling of reactivation gas

The hydrocarbon and water-laden reactivation gas of conduit 29 is a relatively hot stream of the process. To vaporize the adsorbed products of the towers, it is necessary to heat the stream to a relatively high temperature. The beds of the towers are relatively cool when receiving the main stream to have a maximum adsorptive capacity. The main stream will raise the bed temperature a finite amount, but the maximum temperature will follow passage of the hot reactivation gas through the beds. Therefore, to condense the hydrocarbons and water the reactivation stream of conduit 29 must be cooled. Several choices of cooling sources are available. The one, or combination, of these sources selected is a matter of design, involving the characteristics of the particular main stream, the availability of water, size of equipment, etc.

FIG. 1 illustrates the stream of conduit 29 being simply cooled by an available stream of coolant, such as water. Heat exchanger 30 is shown as associating the coolant of conduits 31 and 32 with the captive, reactivation stream of conduit 29. The result is to pass condensed liquid hydrocarbon and water to conduit 33, along with the uncondensed gas of the second circuit.

Figure 2:
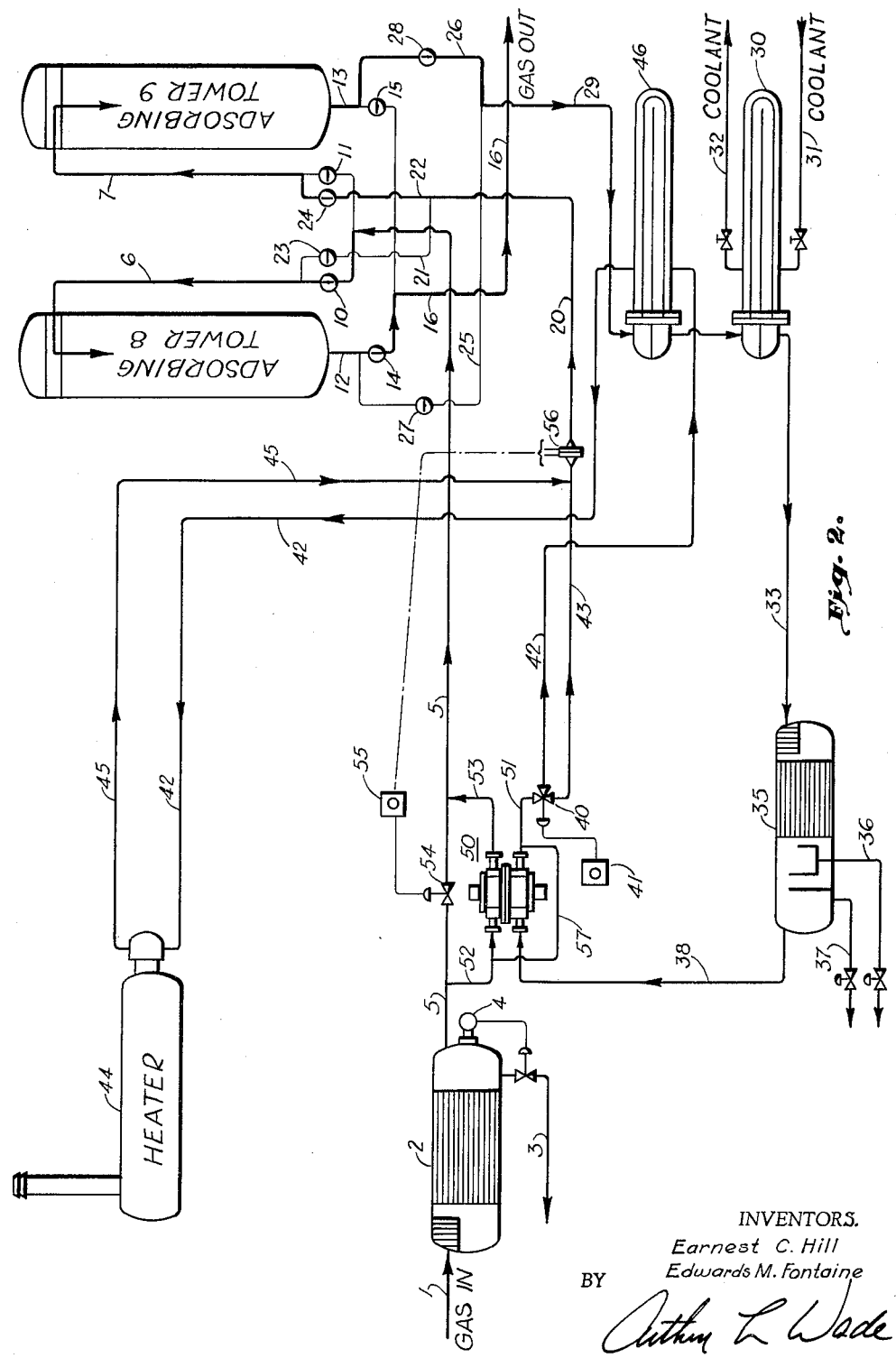
FIG. 2 is similar to the process of FIG. 1 but shows heat exchange between the captive cycle portion going to the heater and the portion of the captive cycle coming from the adsorption towers.

FIG. 2 shows, additionally, how heat of the conduit 29 stream can be passed into the portion of the captive stream going to a heating zone. The exchanger 30 utilizing coolant, such as water, is also illustrated.

Figure 3:
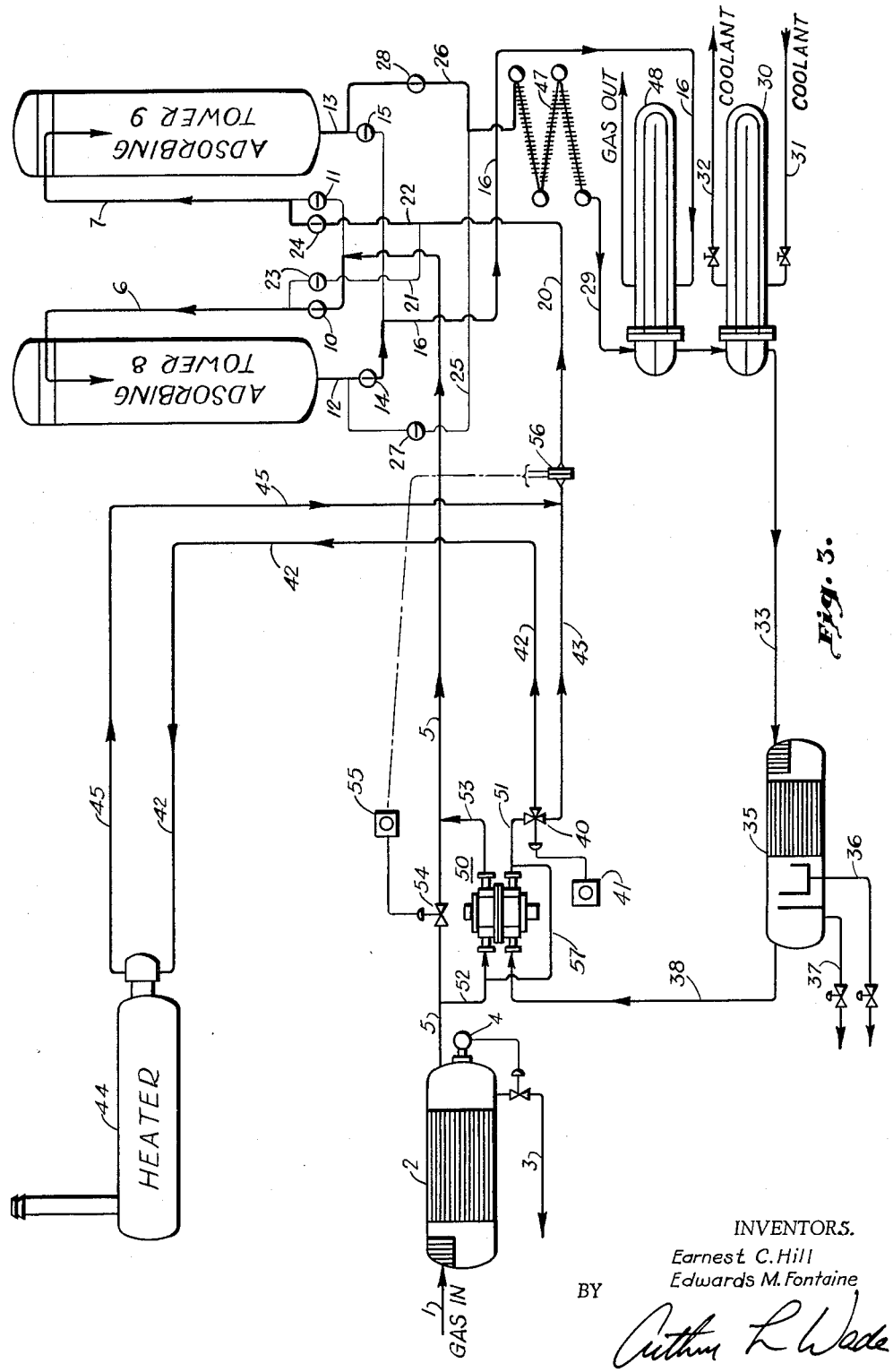
FIG. 3 is similar to FIGS. 1 and 2 but shows the captive cycle from the adsorption towers cooled by ambient air and the dehydrated gas from the towers.

FIG. 3 shows how an atmosphere exchanger may be employed in combination with an exchanger for the relatively cool stream of conduit 16 before it goes on to the pipeline. Exchanger 30 is also shown.

Figure 4:
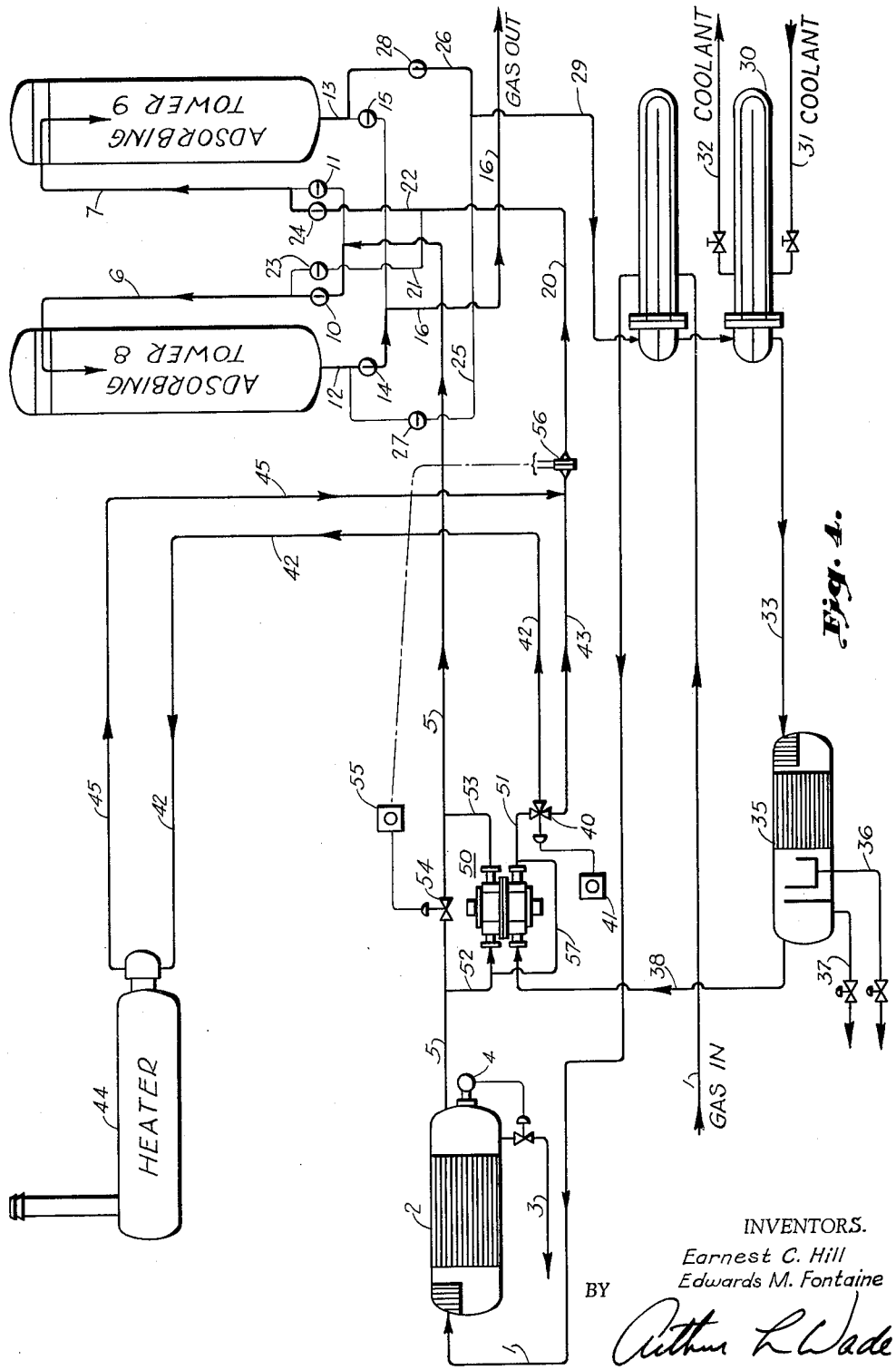
FIG. 4 shows the captive gas cycle from the adsorption towers cooled by the gas to the process.

FIG. 4 shows the feasibility of using the cooling capacity of the liquid-laden main stream to the process for reducing the temperature of the reactivation stream of conduit 29. Exchanger 30 is also shown. Any combination of these cooling means may be employed as illustrated.

Actual operating conditions

In illustration of the temperatures of the process, it is pointed out that the reactivation gas of conduit 20, going to the towers, may be in the order of 600° F. to function in vaporizing the hydrocarbons and water in the adsorbent tower beds. Much of this heat is given up to the tower beds. Although actual values depend upon the particular design considerations, one actual reduction to practice of the invention experienced a drop from 600° F. to about 360° F.

Condenser 30 may receive the gas of conduit 29 at 350° F. to 375° F. and drop it to the order of 85° F.

Separator 35

Some of the ultimate results of the process are realized in the three-phase separation of separator 35. Hydrocarbons are removed through conduit 36, and may be conducted to a stabilizer or storage not shown. Water is removed through conduit 37 and disposed of, and the cool reactivation gas is delivered to conduit 38 for recirculation through the adsorption beds of the towers.

Tower cooling

In partial review, the tower bed stripped of hydrocarbons and water was left at a temperature in the order of 360° F. If the main stream of conduit 5 were then passed through the hot bed its temperature would be quickly dropped. However, there would be a finite period of poor adsorption because of the elevated temperature of the bed. Further, dumping this heat into the main stream would be an unwarranted hazard. The rise in temperature of the flow stream of conduit 16 may dangerously expand downstream lines and connections, resulting in mechanical failures.

The point to be made is that it is usually preferable to use the relatively cool captive stream in conduit 38 to reduce tower temperature. Of course, as indicated supra, it may be feasible to route the conduit 16 gas through the beds if design conditions permitted.

In carrying out the preferable technique of cooling, valve 40 is provided to alternately pass the cool stream of conduit 38 through a heating source and directly to conduit 20. This valve 40 may be controlled by the actual temperature of the towers. The control illustrated in FIGS. 1–4 is that exerted by a time-cycle controller 41. In certain instances it is practical to simply time the cooling period by the stream of conduit 38 so the reactivated tower will be brought to a sufficiently cool temperature to receive the gas of the main stream of conduit 5. In either event, valve 40 directs the cool stream of 38 through either conduit 42 or 43. Conduit 42 takes the cool stream through heater 44 to pick up the heat required for reactivation of the adsorbent. As indicated in connection with FIG. 2, the cycle may be timed to transfer the heat of the conduit 29 to conduit 42 to reduce the load on heater 44.

The stream of conduit 42, being on the order of 100° F., may have its temperature elevated to the order of 600° F. by heater 44. Conduit 45 receives this heated reactivation stream and passes it to conduit 20 as an alternate to the cooled stream of conduit 43. Thus, is completely illustrated the second circuit of the reactivation gas as it is periodically heated and cooled for passage through the towers. Further, analysis of the composition of the reactivation stream at various points in the second, or captive, circuit would be informative. However, the general indication of the temperatures experienced in a practical embodiment of the invention is deemed sufficient to give a grasp of the design variations encountered in utilizing the invention. Before passing to the means of transferring energy between the two circuits, FIGS. 2–4 are presented to specifically orient the location of the other means of cooling the stream of conduit 29.

FIG. 2 shows condenser 30, using a coolant, such as water to cool the captive stream. Additionally, a similar heat exchanger 46 is shown receiving the uncondensed gas of conduit 42, on its way to be heated. The heat of conduit 29 gas is partially transferred in exchanger 46, and the load on heater 44 correspondingly reduced. Of course, the timing of tower switching must be aligned with the diversion of the gas of conduit 38 through conduit 42 or the transfer will not take place at the proper time to capture a significant amount of heat from conduit 29 by conduit 42.

In completing consideration of the cycle, the mechanical means to transfer the flow energy of the fluid in conduits 1 and 5 to the captive cycle becomes important. This mechanical link is specifically embodied in a particular form of motor-compressor illustrated diagrammatically in FIGS. 1–4 at 50 and in detail with FIGS. 5 and 6.

Motor-compressor 50

Essentially, motor-compressor 50 is a sliding vane type of motor on a common shaft with a sliding vane type of compressor. The compressor side of the unit receives the cool stream of conduit 38 and delivers it to conduit 51, going into valve 40. Valve 40, as indicated heretofore, directs this compressor output to either conduit 42 or conduit 43.

The motor side of unit 50 is in a shunt conduit 52–53 around valve 54. Valve 54 is in conduit 5 and regulates the amount of the processed stream which is passed through conduit 52–53. Depending upon the setting of valve 54, more or less of the main stream is received by conduit 52 to regulate the speed of motor-compressor 50.

Valve 54 is regulated by a control 55 which responds to the differentials across orifice 56 in conduit 20. As the differential across orifice 56 varies, controller 53 regulates valve 54 to adjust the amount of the stream in conduit 5 delivered to conduit 52. Motor-compressor 50 thus has its speed adjusted to maintain the differential across orifice 56. This arrangement of control is particularly advantageous in this closed-cycle adsorption process.

Orifice 56

Orifice 56 is exposed to the variation in temperature of the stream in conduit 20 as it is received from either conduit 45 or conduit 43. The flowing temperature of the captive stream of conduit 20 thus varies the flow rate through this second circuit in accordance with the flowing temperature of the stream itself. The result is regulation in the correct direction to vary the flow rate. As the flowing temperature decreases from the insertion of the stream of conduit 43 into conduit 20, motor-compressor 50 is caused to increase in output. The flow rate goes up as the flowing temperature goes down. Alternately, as the heated stream of conduit 45 is caused to flow through orifice 56, the differential variation regulates valve 54 to slow motor-compressor 50 and decrease the flow rate through the second circuit. Thus results in automatic regulation in the correct direction to maintain the flow rate required to efficiently strip the adsorbent material of the tower and cool it prior to again receiving the wet stream to be processed.

By-pass conduit 57

The second circuit being alternately heated and cooled by the function of valve 40, the inventory of gaseous fluid must fluctuate as the volume of the circuit conduits remains constant. FIG. 1 illustrates a second connection between the two circuits in the form of conduit 57. Conduit 57 connects the input side of the compressor of unit 50 with the output side of the motor of unit 50. Through this conduit, the gases of the two volumes interchange as they contract and expand relative to each other. The result is a floating volume of gas in the reactivation circuit which performs the work of hydrocarbon recovery and water extraction in the process.

Figure 5:
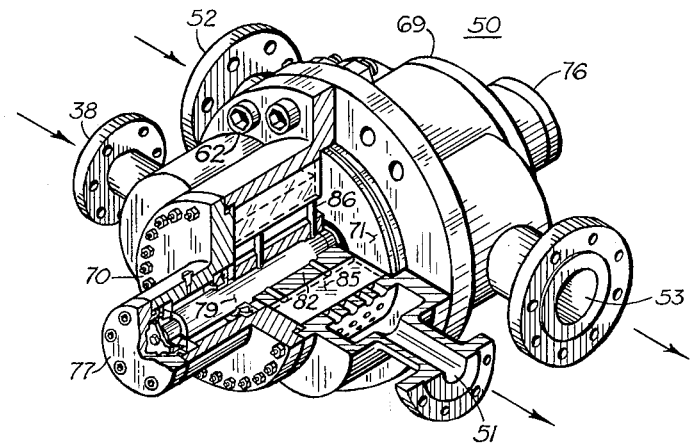
FIGS. 5 and 6 are the various views showing the details of a motor compressor used to transfer energy from the main circuit to the captive circuit.
Figure 6:
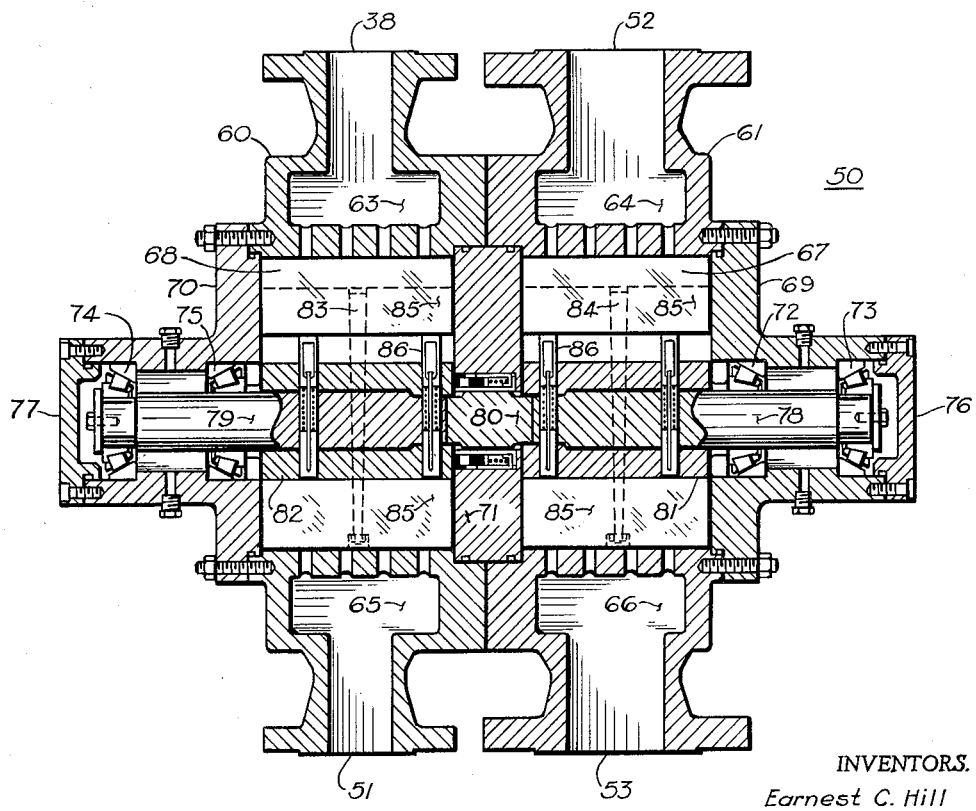

Refer now to FIGS. 5 and 6. FIG. 5 is a partially sectioned isometric and FIG. 6 is a fully sectioned elevation of motor-compressor 50. With these two views a complete appreciation can be gained of the various components of this device and their co-operation with each other to transfer energy from one flowing stream to another.

The motor-compressor 50, in FIGS. 1–4 is specifically powered by the energy of the main fluid stream. The mechanical connection of the shaft assembly enables the main fluid stream energy to drive the captive, reactivation stream through its circuit.

Housing

The specific study of component arrangement logically begins with the housing. This housing is, basically, made up by compressor manifold housing 60 and motor manifold housing 61 abutting and being bolted to each other by cap screws 62. These manifolds can be formed with castings. However, it was also found practical to form them of several parts, welded together.

The input and output connections to conduits 38, 51, 52 and 53 are shown in FIG. 5, roughly oriented with the FIG. 1, showing of the motor-compressor in the fluid circuits. Each of these conduits 38, 51, 52 and 53 register with ports in the housing. The ports terminate in chambers 63, 64, 65 and 66 of the housing. Portholes are drilled between these chambers and the cylinders of the housing.

Cylinders 67 and 68

The housing of the motor-compressor 50 has two cylinders 68 and 67 into which the respective fluids are received and removed through the portholes of chambers 63, 64, 65 and 66. A set of sliding vanes is provided for each cylinder to form chambers of variable size which expand under the pressure of the main stream fluid and compress the fluid of the reactivation stream in energy transfer.

The cylinders 67 and 68 are closed by motor end bell 69 and compressor end bell 70 bolted to their respective manifold housings. Center plate 71 bridges the junction of the manifold housings and is recessed into each of them. This firm capture of center plate 71 provides an inner sidewall for each cylinder 67 and 68. Between the walls of the end bells and the walls of the center piece 71, the vanes slide on the cylinder walls of the manifold housings to transfer the fluids between 52, 53 and 38, 51.

Central shaft

The end bells not only close the cylinders 67 and 68 but also house the bearings for the shaft on which the sliding vanes are mounted. Two pairs of roller bearings are given stable support for their races in bells 69 and 70. Bearings 72 and 73 are mounted in motor end bell 69 and bearings 74 and 75 are mounted in compressor end bell 70. The central shaft structure, offset from the central axis of the cylinders, rotates in these bearings. Caps 76 and 77 are bolted to the ends of bells 69 and 70 to complete the enclosure for the moving parts of the motor-compressor.

The central shaft structure rotating in the bearings 72–75 is made up of three pieces. Motor shaft 78 and compressor shaft 79 are the parts specifically carried in the two pairs of bearings. The inner ends of these two shafts abut a coupler 80 which is, itself, centered in center plate 71. The inner ends of the shafts 78 and 79 which abut the coupler 80 have female splines aligning with female splines of the coupler. When these splines are bridged by a member with a male spline, the shafts turn together.

Rotors 81 and 82

Bridging male splines are provided for the shafts and coupler with motor rotor 81 and compressor rotor 82. These rotors are cylindrical in form and extend between their respective end bells and the faces of center plate 71. The rotors are pinned to their respective shafts by pins 83 and 84 and support the sliding vanes which form the variable volumes with the cylinder walls, the supporting rotors, the inner faces of the end bells and the opposite faces of the center plate 71.

Vanes 85

The rotors are formed with three pairs of longitudinal vane slots. Each pair of slots are opposed across the rotor center. As the rotor and shaft center is off-set from the cylinder axis, the vanes carried in the slots will move radially in the slots to follow the cylinder walls with their edges.

Vanes 85 are in the form of flat plates in the rotor slots. A pair of holes are drilled across the rotor and shaft axis, in the bottom of the slots. Of course, each hole must be longitudinally off-set from each other hole to avoid interference in passing across the shaft axis. In each hole is arranged a spring-loaded pin 86 which continually urges its pair of vanes 85 radially outward against the cylinder walls. These pins 86 can be compressed to facilitate assembly in slipping the rotors, shafts and vanes into the cylinder. Once in position, the pins 86, as an assembly, vary in length to continually exert force against the vanes 85 as they follow the circular cylinder walls about the off-set axis.

Operation of motor-compressor 50

The shaft of the motor-compressor is rotated by the pressure differential between its conduits 52 and 53. The fluid entering from conduit 52 is ported from chamber 64 into the chambers formed by the vanes in cylinder 67 when the vane chambers have a volume smaller than the volume they have at the ports of chamber 66. The differential between the conduits, across the vanes as they move past the chamber 66 ports, results in a force which rotates the vanes and shaft.

The turning of the shaft causes the vane-chambers of cylinder 68 to rotate from the ports of chamber 63 toward the ports of chamber 65. As the vane-chambers of the compressor rotate, they reduce in size from their position at the ports of chamber 63 to their position at the ports of chamber 65. The differential developed across each vane as it is rotated from chamber 63 to chamber 65 is the result of the transfer of a finite portion of the energy of the stream of conduits 52, 53 into the stream of conduits 38, 51.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In the removal of water vapor and condensable hydrocarbons from natural gases involving the contact of adsorbent material with a main flow stream of gas with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases, continuously recycling a captive flow of natural gas as the reactivating agent through adsorbent material which has adsorbed water and hydrocarbons from the main flow stream of natural gases, heating the recycled captive flow of reactivating natural gas before the gas is passed through the adsorbent material, mechanically linking the captive flow of reactivating gas to at least a portion of the main flow stream of natural gas to transfer power of the main flow stream to the captive flow of gas with mechanical motion to recycle the reactivating flow of captive gas, controlling the portion of the main flow stream mechanically linked to the reactivating gas in accordance with flowing temperature of the reactivating gas, and condensing and recovering the water and condensable hydrocarbons from the heated reactivating flow of captive natural gas after it has passed through the adsorbent material.

2. An apparatus for removing water vapor and recovering condensable hydrocarbons from natural gas including, a bed of adsorbent material which will remove water and hydrocarbons from natural gas upon contact, a first circuit conducting natural gases through the bed of adsorbent material, a second circuit arranged to alternately conduct a captive reactivating gas through the bed of adsorbent material, a means for heating the captive reactivating gas in the second circuit, means for mechanically transferring flow energy of the first circuit with a mechanical motion to the second circuit to circulate the captive reactivating gas through the second circuit including a compressor in the second circuit mechanically linked to and powered by a motor in the first circuit, means for by-passing gas of the first circuit around the motor with a regulator responsive to the flowing temperature through the second circuit to vary the flow rate of the captive gas within the second circuit through the adsorbent material, and means for condensing and recovering the water and condensable hydrocarbons from the heated captive reactivating gas in the second circuit after it has passed through the adsorbent material.

3. The method of removing water and recovering condensable hydrocarbons from natural gas which includes;

contacting a first bed of adsorbent material with a main flow stream of natural gas, whereby water and condensable hydrocarbons are adsorbed by the beds;

contacting the first bed with a captive reactivating flow stream of natural gas while the main flow stream is processed by a second bed of adsorbent material;

continuously recycling the captive reactivating flow stream through the first bed and in a path separate from that of the main flow stream;

periodically shunting the captive reactivating flow stream through a source of heat, whereby its vaporizing capacity is increased before passage through the bed;

cooling the captive reactivating flow stream to its dew point, whereby water from the bed is removed and condensable hydrocarbons are recovered and the temperature of the reactivated bed is reduced for adsorptive service on the main flow stream;

mechanically driving the captive reactivating flow stream in its separate path with mechanical motion generated by at least a portion of the main flow stream;

controlling the size of the portion of the main flow stream generating mechanical motion by the flowing temperature of the reactivating flow stream being driven;

and returning the first bed to adsorptive service while regenerating the second bed with the captive flow stream.

4. An apparatus for removing water vapor and recovering condensable hydrocarbons from natural gas including;

a first bed of adsorbent material which will remove water and hydrocarbons from natural gas upon contact;

a first circuit conducting natural gases through the first bed;

a second bed of adsorbent material;

a second circuit arranged to conduct a captive reactivating gas through the first bed while the second bed removes water and hydrocarbons from the natural gas in the first circuit;

means for heating the captive reactivating gas in the second circuit;

means for periodically shunting the captive reactivating gas through the heating means, whereby the vaporizing capacity of the gas is increased before the gas passes through one of the beds;

means for cooling the captive reactivating flow stream to its dew point, whereby water from the beds is removed and consensable hydrocarbons are recovered and the temperature of the reactivated bed is reduced for adsorptive service on the main flow stream;

means for mechanically driving the reactivating gas in the second circuit with a mechanical link moved by a means actuated by at least a portion of the natural gas in the first circuit;

control means for the size of the portion of the driving gas of the first circuit responsive to the flowing temperature of the driven gas of the second circuit;

and switching means for reconnecting the first bed with the first circuit while connecting the second bed with the second circuit.

5. The method of removing water and recovering condensable hydrocarbons from natural gas which includes;

contacting a first bed of adsorbent material with a main flow stream of natural gas, whereby water and condensable hydrocarbons are adsorbed by the beds;

contacting the first bed with a captive reactivating flow stream of natural gas while the main flow stream is processed by a second bed of adsorbent material;

continuously recycling the captive reactivating flow stream through the first bed and in a path separate from that of the main flow stream;

periodically shunting the captive reactivating flow stream through a source of heat, whereby its vaporizing capacity is increased before passage through the bed;

continuously transferring heat from that portion of the captive reactivating flow stream of natural gas flowing out of the first bed to that portion of the flow stream shunted through the heat source, whereby the load on the heat source is reduced and heat of the flow stream is conserved;

cooling the captive reactivating flow stream to its dew point, whereby water from the bed is removed and condensable hydrocarbons are recovered and the temperature of the reactivated bed is reduced for adsorptive service on the main flow stream;

mechanically driving the captive reactivating flow stream in its separate path with mechanical motion generated by the main flow stream;

and returning the first bed to adsorptive service while regenerating the second bed with the captive flow stream.

6. An apparatus for removing water vapor and recovering condensable hydrocarbons from natural gas including;

a first bed of adsorbent material which will remove water and hydrocarbons from natural gas upon contact;

a first circuit conducting natural gases through the first bed;

a second bed of adsorbent material;

a second circuit arranged to conduct a captive reactivating gas through the first bed while the second bed removes water and hydrocarbons from the natural gas in the first circuit;

means for heating the captive reactivating gas in the second circuit;

means for periodically shunting the captive reactivating gas through the heating means, whereby the vaporizing capacity of the gas is increased before the gas passes through one of the beds;

a heat exchanger receiving that portion of the second circuit downstream of the bed being reactivated and that portion of the second circuit through which the reactivating gas is periodically shunted, whereby the load on the heating means is reduced and heat of the reactivating gas is recycled and conserved;

means for cooling the captive reactivating flow stream to its dew point, whereby water from the beds is removed and condensable hydrocarbons are recovered and the temperature of the reactivated bed is reduced for adsorptive service on the main flow stream;

means for mechanically driving the reactivating gas in the second circuit with a mechanical link moved by a means actuated by the natural gas in the first circuit;

and switching means for reconnecting the first bed with the first circuit while connecting the second bed with the second circuit.

7. The process of recovering liquid fractions from a main gas stream which includes, passing the main gas stream through a bed of adsorbent material to extract liquid fractions from said gas, thereafter subjecting the bed to a regeneration cycle by pumping a regeneration stream through said bed, said regeneration cycle including a heating phase during which heated regeneration gas is circulated through said bed to vaporize and pick up the liquid fractions and also including a cooling phase during which unheated regeneration gas is circulated through the bed to cool the same, diverting a portion of the main gas stream and utilizing such diverted portion to effect the pumping of the regeneration gas through the bed, whereby the rate of circulation of the regeneration gas is dependent upon the volume of gas which is diverted, and controlling in accordance with conditions obtaining in the regeneration gas circuit the volume of gas which is diverted from the main gas stream during the heating phase of the regeneration cycle to thereby control the rate of circulation of said regeneration gas through the bed during said heating phase.

References Cited by the Examiner
UNITED STATES PATENTS

| | | |
|---|---|---|
| 2,588,296 | 3/1952 | Russell. |
| 2,629,460 | 2/1953 | Maki. |
| 2,679,541 | 5/1954 | Berg. |
| 2,815,089 | 12/1957 | Turner. |
| 2,880,818 | 4/1959 | Dow. |

REUBEN FRIEDMAN, *Primary Examiner.*

HERBERT L. MARTIN, WALTER BERLOWITZ, WESLEY COLE, *Examiners.*